United States Patent Office 2,879,271
Patented Mar. 24, 1959

2,879,271

BASIC DERIVATIVES OF MONO- AND DI-METHYL XANTHINES, AND A PROCESS OF MAKING SAME

Rolf Kallischnigg, Ludwigshafen (Rhine), Germany, assignor to Knoll A.G. Chemische Fabriken, Ludwigshafen (Rhine), Germany, a corporation of Germany No Drawing. Application July 20, 1954
Serial No. 444,669

Claims priority, application Germany July 23, 1953

5 Claims. (Cl. 260—256)

The present invention relates to new and valuable basic derivatives of mono- and di-methyl xanthines, and more particularly to basic derivatives of mono- and di-methyl xanthines having in 8-position a basic side chain, and to a process of making same.

It is one object of the present invention to provide new and valuable basic derivatives of mono- and di-methyl xanthines having in 8-position a basic side chain, said derivatives favorably affecting the circulatory system and causing a decrease in the total peripheral resistance and increase in the peripheral blood flow.

Another object of the present invention is to provide a simple and effective process of producing such basic derivatives of mono- and di-methyl xanthines.

Other objects of this invention and advantageous features thereof will become apparent as the description proceeds.

In principle, the new and valuable basic derivatives of mono- and di-methyl xanthines according to the present invention correspond to the following formula:

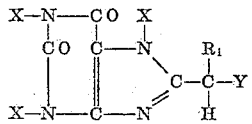

In said formula, $R_1$ indicates hydrogen or a lower alkyl radical, and preferably a methyl or an ethyl radical, X indicates hydrogen or methyl groups, not more than two of them being such methyl groups, and Y is a basic nitrogen containing group, such as the primary amino group $-NH_2$, the secondary amino group $-NHR$, the tertiary amino group $-NRR'$, and the quaternary ammonium group $NRR'R''(Z)$. In said nitrogen containing group, R, R', and R'' are saturated alkyl radicals with at least two carbon atoms and preferably not more than eight carbon atoms, unsaturated alkyl radicals, alkanol radicals, aryl radicals, preferably phenyl radicals, aralkyl radicals, preferably phenyl alkyl radicals, or cyclohexyl radicals, or, together with the nitrogen atom, a nitrogen containing heterocyclic radical and more particularly a morpholino or pyridinium radical, while Z is an anionic radical, preferably the anionic radical of a mineral acid.

These new compounds and similar compounds can very readily be produced according to the present invention by reacting mono- or di-methyl xanthine-8-carbinols and a halogenating agent, and especially a chlorinating agent such as thionyl chloride or phosphorus chlorides, and by converting the resulting methylated 8-halogeno alkyl xanthine compounds, the halogen atom of which is highly reactive, into the corresponding basic compounds by reaction with ammonia, primary, secondary, or tertiary amines.

The starting materials, the mono- and di-methyl xanthine-8-carbinols, are preferably produced by reacting 4,5-diamino-2,6-dioxo tetrahydropyrimidines with α-hydroxy carboxylic acids to form the corresponding 5-hydroxy acylo compounds which are then subjected to a cyclization reaction by means of alkaline agents whereby the corresponding xanthine carbinols are obtained. The tetrahydropyrimidine starting materials may be completely or partly methylated. It is, however, also possible to subsequently react the xanthine-8-carbinols with methylating agents.

The new compounds, especially those with a low molecular basic residue in 8-position of the xanthine molecule, are distinguished over known xanthine derivatives by the characteristic feature that they are water-soluble in the form of the free bases. Furthermore, they are readily soluble in alkalies and organic bases as well as in strong inorganic and organic acids, whereby they form water-soluble salts.

It has previously been suggested to substitute theobromine at the nitrogen atom in 1-position by an alkyl or aryl amino alkyl residue. However, the production of the 1-hydroxy alkyl derivatives which are required for said reaction, from theobromine and of the 1-alkyl- or aryl amino-alkyl derivatives from the corresponding 1-halogeno alkyl derivatives, proceeded only with a very low yield.

It has furthermore been suggested to produce 8-chloro methyl xanthine by the action of the calculated amount of elementary chlorine upon 8-methyl xanthine. This process, however, gives satisfactory results only with caffeine. In contrast hereto, chlorination of 8-methyl theobromine with elementary chlorine produced only 8-trichloro methyl theobromine and some unreacted starting material. 8-chloro methyl theophylline cannot at all be produced in this manner. This is not surprising, since theophylline, on reaction with elementary chlorine, is, for the most part, converted into oxidation products.

In contrast hereto, the new compounds and similar compounds can readily be produced by reacting methylated xanthine-8-carbinols which are readily available, with halogenating agents and especially with chlorinating agents such as thionylchloride or phosphorus chlorides. Thereby the corresponding mono-halogeno alkyl-8-xanthines are obtained. Reaction of said mono-halogeno alkyl xanthines with ammonia, primary, or secondary amines produces with an excellent yield the new and similar basic derivatives of mono- and di-methyl xanthines according to the present invention.

The following examples serve to illustrate this invention without, however, limiting the same thereto:

EXAMPLE 1

8-diethylamino methyl theophylline 165 g. of 8-hydroxy methyl theophylline (M.P. 248° C.) are boiled under reflux with 187 g. of thionylchloride (calculated amount) and 250 g. of chloroform for three days. When using a larger excess of thionylchloride it is not necessary to add chloroform as a solvent and diluting agent. After reaction is complete the mixture is allowed to cool, the resulting crystalline mass is filtered off, washed with chloroform and then with water, and recrystallized from glacial acetic acid. In this manner 8-chloro methyl theophylline is obtained in an almost quantitative yield in the form of colorless crystals of the melting point 249° C. Said crystals are insoluble in almost all organic solvents.

19 g. of diethylamine are added at room temperature, while stirring, to a suspension of 30 g. of 8-chloro methyl theophylline in 150 cc. of ethanol. The mixture is heated for one hour on the water bath, whereby the temperature is slowly and gradually increased, until complete solution has taken place. The solution is filtered while still hot, cooled, and allowed to crystallize. Crystals of 8-diethylamino methyl theophylline melting, after recrystallization from ethanol, at 176–177° C. are obtained in a yield between 75% and 85% of the theoretical yield.

EXAMPLE 2

*8-diethanol amino methyl theophylline*

40 g. of 8-chloro methyl theophylline produced according to Example 1, are stirred with 200 cc. of ethanol and 37 g. of diethanol amine in the cold for a certain period of time and the mixture is finally heated until complete solution takes place. The reaction solution is treated with animal charcoal while still hot, filtered, and caused to crystallize by placing the filtrate into a refrigerator. The crystalline mass is filtered off, washed with ethanol, and recrystallized from ethanol. Melting point: 154° C. Yield: 80–90% of the theoretical yield.

EXAMPLE 3

*8-di-n-butylamino methyl theophylline*

40 g. of 8-chloro methyl theophylline obtained according to Example 1 are placed in a round-bottom flask provided with stirrer, reflux condenser, and dropping funnel and are suspended in 300 cc. of benzene. 45 g. of di-n-butylamine are slowly and gradually added to said chloro compound and benzene, while stirring, whereby increase in temperature of the mixture takes place. Stirring is continued and the mixture is finally heated whereby solution takes place. On allowing said mixture to stand for some time while cooling, the contents of the flask solidify. The resulting crystalline mass is filtered off after standing for some time in a refrigerator, washed with water to dissolve admixed di-n-butylamine hydrochloride, and the resulting 8-di-n-butyl amino methyl theophylline which is difficultly soluble in water, is recrystallized from ethanol. Melting point of the base: 148° C., melting point of the chlorohydrate, after recrystallization from acetone: 200° C. Yield: 90% of the theoretical yield.

The hydrochloride of said 8-di-n-butylamino methyl theophylline is obtained, for instance, by dissolving the base in absolute ethanol and passing gaseous hydrochloric acid into said solution.

EXAMPLE 4

*8-morpholino methyl theophylline*

23 g. of morpholine are added portion by portion to a suspension of 30 g. of 8-chloro methyl theophylline obtained according to Example 1 in 200 cc. of ethanol. The mixture is stirred for one hour in the cold and finally heated on the water bath until complete solution takes place. Animal charcoal is added to the hot solution which is then filtered and cooled to 0° C. The resulting crystalline mass is washed with a small amount of ethanol and is recrystallized from ethanol. Melting point: 244° C. Yield: about 85% of the theoretical yield.

EXAMPLE 5

*8-N-benzyl-N-methylamino methyl theophylline*

A solution of 20.5 g. of benzyl methylamine in 200 cc. of ethanol are added to 30 g. of 8-chloro methyl theophylline obtained according to Example 1. The mixture is stirred in the cold for one hour and is then boiled under reflux until the chloro methyl theophylline is completely dissolved. After evaporating the solvent, the residue is treated with water to remove benzyl methylamine chlorohydrate. The remaining crystalline product is recrystallized from ethanol. Melting point: 186° C. Yield: exceeding 80% of the theoretical yield.

EXAMPLE 6

*8-N-β-hydroxy ethyl-N-methylamino methyl theophylline*

A suspension of 30 g. of 8-chloro methyl theophylline in 150 cc. of ethanol is reacted with 19.5 g. of β-hydroxy ethyl methylamine as described in Example 5. The resulting crystalline reaction product melts at 160° C. after recrystallization from ethanol. Yield: 75% of the theoretical yield.

EXAMPLE 7

*8-diallylamino methyl theophylline*

A suspension of 30 g. of 8-chloro methyl theophylline in 150 cc. of ethanol is reacted with 25.5 g. of diallylamine as described in Example 5. The resulting crystalline product, on recrystallization from absolute ethanol, melts at 166° C. Yield: 70% of the theoretical yield.

EXAMPLE 8

*8-N-cyclohexyl-N-methylamino methyl theophylline*

A suspension of 50 g. of 8-chloro methyl theophylline in 250 cc. of ethanol are reacted with 50 g. of cyclohexyl methylamine as described in Example 5. The reaction mixture is concentrated by evaporation to a volume of 200 cc. whereby a crystalline product is obtained which is filtered off, washed with ethanol, and recrystallized from dilute ethanol. Melting point: 188° C. Yield: 85% of the theoretical yield.

EXAMPLE 9

*8-N-isobutyl-N-methylamino methyl theophylline*

A suspension of 30 g. of 8-chloro methyl theophylline in 200 cc. of ethanol is reacted with 25 g. of isobutyl methylamine in a similar manner as described in Example 5. The resulting product is recrystallized from ethanol and melts at 159° C. Yield: About 75% of the theoretical yield.

EXAMPLE 10

*8-N-[6'-methyl heptene-(5')-yl-(2')]-N-methylamino methyl theophylline*

37 g. of [6-methyl heptene-(5)-yl-(2)] methylamine are added to a suspension of 30 g. of 8-chloro methyl theophylline in 200 cc. of ethanol. The mixture is stirred in the cold for one hour and thereafter for two further hours while heating, finally to boiling temperature. The clear, hot solution is filtered after addition of charcoal, the filtrate is cooled, and the resulting crystalline mass, after standing in the refrigerator, is filtered off and twice recrystallized from ethanol. Melting point: 127–128° C. Yield: 70% of the theoretical yield.

EXAMPLE 11

*8-N-phenyl-N-ethylamino methyl theophylline*

A suspension of 30 g. of 8-chloro methyl theophylline in 30 cc. of ethanol is boiled with 35 g. of ethyl aniline under reflux for two days. After cooling, the resulting crystalline mass is filtered off, washed with ethanol and acetone, and recrystallized from ethanol containing hydrochloric acid. The chlorohydrate of 8-N-phenyl-N-ethylamino methyl theophylline is obtained in a yield of 80% of the theoretical yield. The melting point is about 194° C. By repeated recrystallization of said chlorohydrate from dilute ethanol, it is hydrolyzed and the free base of the melting point 219° C. is obtained.

EXAMPLE 12

*8-N-benzyl-N-cyclohexylamino methyl theophylline*

A suspension of 30 g. of 8-chloro methyl theophylline in 200 cc. of ethanol is reacted with 25 g. of benzyl cyclohexylamine as described in Example 5. 8-N-benzyl-N-cyclohexylamino methyl theophylline melting at 175° C. is obtained thereby in a yield of 80% of the theoretical yield.

EXAMPLE 13

8-N-phenyl-N-benzylamino methyl theophylline 50 g. of dry and finely pulverized potassium carbonate and 25 g. of benzyl aniline are added to a suspension of 30 g. of 8-chloro methyl theophylline in 300 cc. of ethanol. The reaction mixture is boiled under reflux for two days while stirring vigorously, filtered while still hot, and cooled to 0° C. Crystalline 8-N-phenyl-N-benzylamino methyl theophylline precipitates. It has a melting point of 211° C. after recrystallization from dilute ethanol. Yield: 70% of the theoretical yield.

EXAMPLE 14

8-cyclohexylamino methyl theophylline 30 g. of 8-chloro methyl theophylline are added in small portions to a solution of 52 g. of cyclohexylamine in 400 cc. of ethanol in the course of three hours while stirring vigorously. Stirring is continued for four hours in the cold and for three more hours while heating the reaction mixture to boiling. The solvent is then evaporated, the residue is boiled with water to remove the di-theophylline compound which is insoluble in water. Said bis-(8,8'-theophylline methyl) cyclohexylamine is recrystallized from glacial acetic acid. Its melting point is 273–275° C.

The aqueous solution obtained on removing said di-theophylline compound is filtered with charcoal, evaporated to dryness in a vacuum, and the residue is recrystallized from ethanol, yielding 8-cyclohexylamino methyl theophylline of the melting point 179–180° C.

EXAMPLE 15

8-isobutylamino methyl theophylline 30 g. of 8-chloro methyl theophylline are added in small portions to a solution of 40 g. of isobutylamine in 400 cc. of ethanol. The reaction mixture is stirred for five hours in the cold and for three more hours while heating. The solvent is evaporated and the resulting residue is boiled with water. The undissolved product is recrystallized from glacial acetic acid, yielding bis-(8,8'-theophylline methyl) isobutylamine of the melting point 289° C.

The aqueous solution obtained thereby is evaporated to dryness and the residue is recrystallized from ethanol, yielding 8-isobutylamino methyl theophylline melting at 203° C.

EXAMPLE 16

Theophylline-8-methyl pyridinium chloride 7 g. of pyridine are added to a suspension of 20 g. of 8-chloro methyl theophylline in 300 cc. of ethanol. The reaction mixture is slowly heated while stirring and is then boiled until complete solution takes place. On cooling, the chloride of the quaternary theophylline-8-methyl pyridinium base precipitates. Its melting point, after recrystallization from ethanol, is 297° C.

EXAMPLE 17

8-α-diethylamino ethyl theophylline 800 g. of thionylchloride are slowly added drop by drop to 110 g. of dry 8-α-hydroxy ethyl theophylline, melting at 225–226° C. Reaction sets in instantaneously but ceases gradually. To complete reaction, the mixture is heated under reflux for five hours. Thereby first a clear solution is obtained whereafter the chloro compound formed slowly crystallizes. After cooling and standing in a refrigerator, the crystals are filtered off and are washed with chloroform and water. The thionylchloride-chloroform solution is subjected to distillation. The residue is treated with water and is combined with the main portion of the crystalline material obtained after washing with chloroform and water. The combined crystals are recrystallized from glacial acetic acid. The resulting 8-α-chloro ethyl theophylline has a melting point of 318° C. The yield is almost quantitative.

18 g. of diethylamine are added to a suspension of 30 g. of said 8-α-chloro ethyl theophylline in 200 cc. of ethanol. The reaction mixture is stirred at room temperature for one hour, is slowly heated, and finally boiled under reflux until a clear solution results. Charcoal is added to said solution which is then filtered while still hot. The filtrate is allowed to crystallize in a refrigerator. Crystals of 8-α-diethylamino ethyl theophylline of the melting point 186° C., after recrystallization from ethanol, are obtained. The yield is 80% of the theoretical yield.

EXAMPLE 18

8-α-(di-n-butylamino) ethyl theophylline 106.3 g. of di-n-butyl amine are slowly added drop by drop to a solution of 100 g. of 8-α-chloro ethyl theophylline in 400 cc. of benzene. The further procedure is as described in Example 17. Di-butylamine chlorohydrate is dissolved from the reaction mixture by means of water. The resulting crystals of 8-α-(di-n-butylamino) ethyl theophylline are recrystallized from ethanol and melt at 158° C. Yield: 88%.

EXAMPLE 19

8-(α-piperidino ethyl)-3-methyl xanthine 100 g. of 8-(α-hydroxy ethyl)-3-methyl xanthine of the melting point 305° C. are added in portions to 250 g. of phosphorus oxychloride. The mixture is heated until complete solution takes place. Thereafter most of the excess phosphorus oxychloride is distilled off in a low vacuum, chloroform is added to the residue, and the mixture is allowed to crystallize on standing in a refrigerator. The crystalline mass is filtered off, washed with water, and boiled with acetone. Melting point: 291° C. Yield: 90%.

21 g. of piperidine are added to a suspension of 30 g. of said 8-(α-chloro ethyl)-3-methyl xanthine obtained as described above, in 300 cc. of ethanol. The mixture is stirred at room temperature for two hours and thereafter one more hour at 50–60° C. Finally the mixture is boiled under reflux for four hours. A crystalline mass is obtained on cooling which is filtered off. On recrystallization from dilute ethanol, 8-(α-piperidino ethyl)-3-methyl xanthine of the melting point 235° C. is obtained in a yield of 80%.

EXAMPLE 20

8-α-(N-benzyl-N-methylamino) ethyl-3-methyl xanthine

A solution of 30 g. of 8-(α-chloro ethyl)-3-methyl xanthine in 300 cc. of ethanol are reacted with 31.5 g. of benzyl methylamine as described in Example 19. Crystalline 8-α-(N-benzyl-N-methylamino) ethyl-3-methyl xanthine is obtained in a yield of 68%. Melting point, after recrystallization from ethanol: 212° C.

EXAMPLE 21

8-piperidino methyl theobromine 500 cc. of thionylchloride are added drop by drop to 250 g. of dry 8-hydroxy methyl theobromine melting at 297–299° C. Instantaneously vigorous reaction sets in. Said reaction gradually ceases and the reaction mixture is then boiled under reflux for eight hours. Thereafter the reaction mixture is diluted with chloroform, the mixture is allowed to stand for some time in a refrigerator and the crystalline product is filtered off, washed with chloroform, and then with water. On recrystallization from glacial acetic acid, 8-chloro methyl theobromine of the melting point 251–253° C. is obtained. Yield: exceeding 90% of the theoretical yield.

22.5 g. of piperidine are added to a solution of 30 g. of said chloro compound in 300 cc. of ethanol. The reaction is carried out as described in the preceding examples. The resulting reaction product, 8-piperidino methyl theobromine, is recrystallized from aqueous ethanol (1:1) and has a melting point of 248–250° C.

EXAMPLE 22

8-di-n-butylamino methyl theobromine 34 g. of di-n-butylamine are reacted with 30 g. of 8-chloro methyl theobromine in 300 cc. of ethanol as described in Example 21. Crystalline 8-di-n-butyl amino methyl theobromine is obtained thereby which melts, after recrystallization from ethanol, at 160° C. Yield: 87% of the theoretical yield.

EXAMPLE 23

8-di-(β-hydroxy ethyl) amino methyl theobromine 27.5 g. of di-ethanolamine are reacted with 30 g. of 8-chloro methyl theobromine in 300 cc. of ethanol in a similar manner as described in Example 21. Crystalline 8-di-(β-hydroxy ethyl) amino methyl theobromine which, after recrystallization from ethanol, melts at 169° C. is obtained in a yield of 79% of the theoretical yield.

EXAMPLE 24

8-diallylamino methyl theobromine 25.5 g. of diallylamine are added to a suspension of 30 g. of 8-chloro methyl theobromine in 200 cc. of ethanol. The reaction is carried out in a similar manner as described in Example 21. Crystalline 8-diallylamino methyl theobromine is obtained in a yield of 89% of the theoretical yield. The melting point of said compound, after recrystallization from dilute ethanol, is at 143–144° C.

EXAMPLE 25

8-N-benzyl-N-methylamino methyl theobromine 32 g. of benzyl methylamine are reacted with a suspension of 30 g. of 8-chloro methyl theobromine in 300 cc. of ethanol in an analogous manner as described in Example 21. Crystalline 8 - N - benzyl-N-methylamino methyl theobromine is obtained in a yield of 83% of the theoretical yield. Its melting point, after recrystallization from dioxane, is 239–240° C.

EXAMPLE 26

8 - N - [6' - methyl heptene-(5')-yl-(2')]-N-methylamino methyl theobromine

A suspension of 30 g. of 8-chloro methyl theobromine in 200 cc. of ethanol is reacted with 37 g. of 6-methylamino-2-methyl heptene-(2) as described in Example 24. The resulting reaction solution is concentrated by evaporation to a volume of 150 cc. Said solution is kept for a prolonged period of time at 0° C. whereby crystalline 8 - N - [6'-methyl heptene-(5')-yl-(2')]-N-methylamino methyl theobromine is obtained. Said produce is recrystallized from ethanol and melts at 112° C. Yield: 80% of the theoretical yield.

EXAMPLE 27

8-N-phenyl-N-ethylamino methyl theobromine 30.5 g. of ethyl aniline are added to a suspension of 26 g. of 8-chloro methyl theobromine in 200 cc. of ethanol. The mixture is boiled under reflux for five hours while stirring. After cooling, the crystalline product is boiled with dilute ethanol and subsequently with aqueous acetone and is recrystallized from dioxane. Melting point: 230° C. Yield: 84% of the theoretical yield.

The above mentioned compounds and other compounds of similar constitution can be prepared by other suitable methods. For instance, 1,3-dimethyl-4, 5-diamino-2,6-dioxo tetrahydropyrimidine is reacted with α-chloro carboxylic acids or α-chloro carboxylic acid chlorides to 1,3-dimethyl-2,6-dioxo-4-amino 5-α-chloro acyl amino tetrahydropyrimidine compounds. Reacting said compounds with amines yields the corresponding 5-α-amino acyl compounds which can be converted into 8-α-amino alkyl methyl xanthines by cyclization by means of alkalies.

Another method of making such new 8-α-amino alkyl methyl xanthines consists in hydrogenating 8-cyano theophylline or theobromine and partly or completely alkylating the resulting 8-amino methyl xanthines.

Still another method of making these compounds comprises subjecting 8-formyl methyl xanthines to a reducing condensation reaction with primary amines. The resulting secondary amines are then alkylated to tertiary or quaternary amines.

The following examples serve to illustrate these other methods of producing said new basic derivatives of mono- and di-methyl xanthines having in 8-position a basic side chain:

EXAMPLE 28

1,3 - dimethyl - 2,6 - dioxo - 4 - amino - 5 - diethylamino acetylamino tetrahydropyrimidine 30 g. of 1,3-dimethyl-2,6-dioxo-4-amino-5-chloro acetylamino tetrahydropyrimidine are suspended in a flask provided with a stirrer, reflux condenser, and dropping funnel, in 250 cc. of chloroform. 50 g. of finely pulverized potassium carbonate are also suspended therein. To said suspension, 18 g. of diethylamine are added, the mixture is stirred, in the beginning, at room temperature, and, thereafter, for five hours while boiling on the water bath. The inorganic salts are filtered off, and chloroform and excess of diethylamine are completely distilled off from the resulting filtrate. The residue is recrystallized from acetone. Yield: 65% of the theoretical yield. Melting point: 133° C.

8-diethylamino methyl theophylline 10 g. of said 1,3-dimethyl-2,6-dioxo-4-amino-5-diethylamino acetylamino tetrahydropyrimidine are dissolved in 50 cc. of water. Twice the calculated amount of sodium hydroxide is added thereto, and the mixture is boiled for about three hours. The reaction product is acidified by addition of glacial acetic acid, again rendered alkaline by addition of sodium carbonate, and 8-diethylamino methyl theophylline is extracted with chloroform. After evaporating the chloroform, the residue is recrystallized from ethanol. Yield: 55% of the theoretical yield. Melting point: 176° C.

EXAMPLE 29

1,3-dimethyl-2,6-dioxo-4-amino-5-di-n-butylamino acetylamino tetrahydropyrimidine 50 g. of 1,3-dimethyl-2,6-dioxo-4-amino-5-chloro acetylamino tetrahydropyrimidine are suspended in 200 cc. of ethanol. 52.3 g. of di-n-butylamine are added thereto and the mixture is boiled under reflux for four hours. Clear solution takes place thereby. The mixture is placed into a refrigerator. The precipitated crystals are filtered off and are recrystallized from ethanol. Yield: 85% of the theoretical yield. Melting point: 157–158° C.

8-(di-n-butylamino) methyl theophylline 36.0 g. of said 1,3-dimethyl-2,6-dioxo-4-amino-5-diethylamino acetylamino tetrahydropyrimidine are boiled under reflux in 100 cc. of water containing 9 g. of sodium hydroxide for two hours. The sodium compound of the resulting theophylline derivative crystallizes almost quantitatively on cooling. It is dissolved in water, decomposed by addition of acid, and the base is liberated from the resulting salt with said acid by means of sodium carbonate. The precipitated crystals are filtered off, dried, and recrystallized from ethanol. Yield: 91% of the theoretical yield. Melting point: 146–148° C.

The chlorohydrate of said 8-(di-n-butylamino) methyl theophylline, on recrystallization from acetone, has a melting point of 200° C., its phosphate, on recrystallization from ethanol, has a melting point of 178° C.

EXAMPLE 30

*1,3 - dimethyl - 2,6 - dioxo - 4 - amino - 5 - morpholino acetylamino tetrahydropyrimidine*

23 g. of morpholine are added to 30 g. of 1,3-dimethyl-2,6-dioxo-4-amino-5-chloro acetylamino tetrahydropyrimidine in 200 cc. of ethanol. The mixture is first moderately heated and then boiled under reflux for four hours. The reaction product precipitates in crystalline form on cooling the clear reaction solution. It is filtered off and recrystallized from ethanol. Yield: 88% of the theoretical yield. Melting point: 264–265° C.

*8-morpholino methyl theophylline*

20 g. of 1,3-dimethyl-2,6-dioxo-4-amino-5-morpholino acetylamino tetrahydropyrimidine are boiled under reflux in about 80 cc. of water with the calculated amount of sodium hydroxide solution for two hours. Carbon dioxide is introduced into the clear solution until all the sodium hydroxide is converted into sodium carbonate. The precipitated crystals are filtered off and recrystallized from dilute ethanol. Yield of 8-morpholino methyl theophylline: 86% of the theoretical yield. Melting point: 243–244° C.

EXAMPLE 31

*1,3-dimethyl-2,6-dioxo-4-amino-5-cyclohexyl methylamino acetylamino tetrahydropyrimidine*

27.5 g. of cyclohexyl methylamine are added to 30 g. of 1,3-dimethyl-2,6-dioxo-4-amino-5-chloro acetylamino tetrahydropyrimidine in 200 cc. of ethanol and the mixture is boiled under reflux for four hours. The reaction product, on cooling the clear solution, precipitates in the crystalline state. It is filtered off and recrystallized from ethanol. Yield: 82% of the theoretical yield. Melting point: 171–173° C.

*8-(cyclohexyl methylamino)-methyl theophylline*

20 g. of said 1,3-dimethyl-2,6-dioxo-4-amino-5-cyclohexyl methylamino acetylamino tetrahydropyrimidine are boiled under reflux in 100 cc. of water with twice the calculated amount of sodium hydroxide for two hours. The reaction solution is acidified and 8-(cyclohexyl methylamino)-methyl theophylline is set free from said acid solution by the addition of sodium carbonate. The crystals are filtered off by suction until substantially dry and are recrystallized from ethanol. Yield: 95% of the theoretical yield. Melting point: 203–204° C.

EXAMPLE 32

*1,3 - dimethyl - 2,6 - dioxo - 4 - amino - 5 - benzyl methylamino acetylamino tetrahydropyrimidine*

29 g. of benzyl methylamine are added to 30 g. of 1,3-dimethyl-2,6-dioxo-4-amino-5-chloro acetylamino tetrahydropyrimidine in 150 cc. of ethanol and the mixture is boiled under reflux for four hours. The reaction product precipitates in the crystalline state from the clear solution on cooling. It is filtered off and recrystallized from ethanol. Yield: 75% of the theoretical yield. Melting point: 203–204° C.

*8-(benzyl methylamino) methyl theophylline*

An excess of 50% over the calculated amount of sodium hydroxide is added to 20 g. of 1,3-dimethyl-2,6-dioxo-4-amino-5-benzyl methylamino acetylamino tetrahydropyrimidine in 100 cc. of water and the mixture is boiled under reflux for two hours. The reaction product is acidified and the base is set free from the resulting acid solution by the addition of sodium carbonate. 8-(benzyl methylamino) methyl theophylline is filtered off and recrystallized from ethanol. Yield: 95% of the theoretical yield. Melting point: 186° C.

The starting material used in the Examples 28 to 32 is prepared by boiling 1,3-dimethyl-2,6-dioxo-4,5-diamino tetrahydropyrimidine with chloro acetic acid according to the procedure disclosed in German Patent No. 213,711. It was found, however, that the following procedure produces higher yields.

68 g. of chloro acetylchloride are rapidly added drop by drop at room temperature, while stirring, to a suspension of 85 g. of 1,3-dimethyl-2,6-dioxo-4,5-diamino tetrahydropyrimidine in 1200 cc. of chloroform. Thereby the temperature of the reaction mixture gradually increases. The mixture is then heated under reflux on the water bath for 10 hours while stirring. After cooling, the reaction product is separated from the solvent, washed with chloroform, dried in a vacuum, and recrystallized from water. Its melting point is 215–217° C. The yield amounts to 78% of the theoretical yield. The compound is readily soluble in hot water and methanol and insoluble in ether, acetone, and chloroform.

When using α-chloro propionic acid chloride or α-chloro butyric acid chloride in this reaction in place of chloro acetic acid chloride, the corresponding 1,3-dimethyl-2,6-dioxo-4-amino-5-(α-chloro propionyl)- or (α-chloro butyryl) amino tetrahydropyrimidine compounds are obtained which, with tertiary bases, such as diethylamine, di-n-butylamine, morpholine, benzyl methylamine and others and subsequent ring closure, yield the corresponding 8-α-(diethylamino) ethyl or propyl theophylline, 8-α-(di-n-butylamino) ethyl or propyl theophylline, etc.

As stated hereinbefore and shown in the examples, the new compounds are capable of forming acid addition compounds with inorganic acids, such as sulfuric acid, hydrochloric acid, hydrobromic acid, phosphoric acid and others, as well as with organic acids, such as acetic acid, tartaric acid, lactic acid, citric acid and others. The acid addition compounds with organic acids, however, are more readily hydrolyzed than those with inorganic acids. Therefore, it is advisable to use a certain excess of said organic acids in aqueous solutions of such salts.

The new compounds are also capable of forming salts with inorganic and organic bases. Stable aqueous solutions can, for instance, be obtained with diethylamine, piperidine, ethylene diamine and the like. As inorganic bases there are especially suitable for salt formation the alkali hydroxides, such as sodium hydroxide and potassium hydroxide. Ammonia and alkali carbonates cannot be used since they precipitate the bases from their salt solutions.

As stated above, the new compounds are of high vasolytic activity and have a very favorable effect upon the circulatory system. Said compounds cause a decrease in the total peripheral resistance and increase in the peripheral blood flow. Following there are given some pharmacological and clinical data for a number of compounds according to the present invention.

The toxicity of 8-n-dibutylamino methyl theophylline (DL 50) amounts to 210 mg./kg. on subcutaneous administration and 120 mg./kg. on intravenous administration to white mice. On oral administration it was tolerated in doses of 1500 mg./kg. or even higher. Such a dose is usually without any toxic effect and might sometimes merely cause slight spasms for a short period of time.

Said 8-n-dibutylamino methyl theophylline and other compounds according to the present invention are administered to human beings, preferably in the form of their acid addition products, such as the hydrochloride, the hydrobromide, the sulfate and the like, by injection or orally in the form of tablets, sugar-coated dragées or the like preparations. The dosage administered is between 100 mg. and 400 mg. of the hydrochloride of said bases, an amount which corresponds to 50–200 mg. of theophylline. To prepare an injectable preparation said amount is dissolved in 2 cc. of water or saline solution. Tablets or dragées contain preferably 100 mg. of the hydrochloride of said bases, corresponding to about 50 mg. of theophylline.

The new salt-forming compounds according to the present invention represent a substantial advance in the art, since they permit injection of a stable solution of said drug without the addition of agents which serve as dissolving mediators. Such mediators, for instance, ethylene diamine, as is known, produce certain side reactions which are often very undesirable.

The action of 8-n-dibutylamino methyl theophylline and other compounds according to the present invention on the circulatory system can be demonstrated in animal experiments on cats by an increase of the output of the heart, i.e., the volume of circulation, and the minute volume (increase of the blood pressure amplitude), and by an increase of the functional capacity of the heart. This effect, however, does not persist as long as the decrease in peripheral resistance and in the elasticity coefficient which are also observed on administration of said drug. Furthermore, in all such experiments the diastolic blood pressure is lowered while occasionally a slight rise in systolic blood pressure occurs. When administering higher doses, the blood pressure depressing effect is prolonged.

Evaluation of said drugs on dogs after preliminary narcosis with morphine and pernocton according to the method of Wezler and Boeger, "Ergebnisse der Physiologie," vol. 41, page 292 (1939) shows that they are far superior to theophylline and its most widely used derivatives in their action upon the circulatory system when administered in equivalent dosage. Some of said compounds have a stimulating effect similar to that of theophylline upon the respiratory center. This can very readily be demonstrated after damaging the respiratory center by means of morphine. A number of said new drugs are also capable of eliminating or checking bronchospasms. A dose of 1 mg./kg. administered intravenously is sufficient to produce such spasmolytic effects in animal experiments. A higher dose even increases said effect.

A very important advantage of the new drugs is their capacity of staying in solution in the gastric juice even when they remain in the stomach for several hours. In contrast hereto, theophylline is precipitated from its commercial preparations which usually contain basic agents to increase its solubility, by the gastric juice to 75% and by the intestinal juice to 50%. Thereby the pH of the gastric juice is increased from 3.0 to 8.0 and even up to 8.9. The new compounds, in contrast hereto, do not substantially affect the pH-value of the gastric juice. This explains why, for instance, 8-n-dibutylamino methyl theophylline and the like compounds can be reliably administered even on oral application and why they are much more compatible than other theophylline preparations.

The new drugs exhibit in animal experiments a remarkable diuretic effect which is especially pronounced on oral administration. Their diuretic effect surpasses even that of theophylline-sodium theophylline.

Some of said new compounds, for instance, 8-n-dibutylamino methyl theophylline, exhibit in a concentration as low as 1:20,000, marked amplification of the muscle performance when tested on the diaphragm of rats.

The stimulating effect of said drug upon the central nervous system is demonstrated in animal experiments by an increase in motility.

In general, the compounds according to the present invention exhibit low toxicity on oral administration and other favorable pharmacological properties. Most of them are non-toxic on oral administration, when given to rats, in a dose of 1.0–1.5 g./kg.

The action of the new theophylline derivatives upon the circulatory system is in most cases very impressive and in many cases at least equal to that of a solution of theophylline in sodium theophylline. Especially effective with respect to a persistent depression of the blood pressure are 8-n-dibutylamino methyl theophylline, α-(8-dibutylamino) ethyl theophylline, and 8-benzyl cyclohexylamino methyl theophylline.

About 4–5 mg./kg. of body weight are sufficient in order to neutralize the damaging effect of morphine upon respiration whereby, for instance, 8-n-dibutylamino methyl theobromine is about as effective as 8-n-dibutylamino methyl theophylline and 8-n-dibutylamino ethyl theophylline.

The most effective and therapeutically most useful compound of this series of compounds is the 8-n-dibutylamino ethyl theophylline of Example 18. Said compound, as has been found in pharmacological as well as clinical experiments, exhibits excellent diuretic effects, highly favorable actions on the circulatory system, and a marked direct amplification of the muscle performance while it does not substantially affect the central nervous system nor increase motility nor causes undesired stimulation of respiration. The hydrochloride of said α-(8-di-n-butylamino) ethyl theophylline is the most preferred salt of said compound. It is obtained by dissolving said base in absolute ethanol and passing gaseous hydrochloric acid into said solution.

The diuretic effect of the new preparations and especially of that of the most effective 8-n-dibutylamino ethyl theophylline is at least equal and usually superior to that of the highly effective theophylline-sodium theophylline.

As stated above, the new compounds are preferably orally administered in the form of tablets, pills, powders, capsules, solutions, emulsions, suspensions, dispersions and in any other suitable form. They are preferably not used as such but are diluted with suitable diluting agents, thus, allowing better and more economical use to be made thereof.

In the case of powders, fine, uniform dispersion of the active compound within the diluting agent is of importance. Such a fine dispersion can be achieved, for instance, by mixing and milling the new compounds with a solid, pulverulent extending agent to the desired degree of fineness or by impregnating the already milled, finely powdered, solid carrier with a solution of the active compound in water or a water miscible solvent and then removing the water or solvent.

As solid carriers which are suitable for the manufacture of pulverulent preparations, various inert pulverulent distributing agents may be employed.

When preparing tablets, pills, powders and the like, the commonly used diluting agents, binders and the like are employed, such as sugar, lactose, talcum, starch, pectins, and as binders, gelatin, gum arabic, methyl cellulose, yeast extract, agar, tragacanth and others.

For preparing tablets of 8-n-dibutylamino methyl theophylline for instance, may be used the following mixture:

|  | G. |
|---|---|
| 8-n-dibutylamino methyl theophylline | 0.100 |
| Starch | 0.070 |
| Talcum | 0.030 |
| Pro one tablet | 0.200 |

For preparing tablets of 8-n-dibutylamino ethyl theophylline is mentioned the following mixture:

|  | G. |
|---|---|
| 8-n-dibutylamino ethyl theophylline | 0.100 |
| Starch | 0.060 |
| Lactose | 0.020 |
| Talcum | 0.020 |
| Pro one tablet | 0.200 |

I claim:
1. 8-di-n-butylamino methyl theophylline.
2. 8-α-di-(n-butylamino) ethyl theophylline.

3. The hydrochloride of 8-di-n-butylamino methyl theophylline.

4. The hydrochloride of 8-di-n-butylamino ethyl theophylline.

5. An 8-di-n-butylamino alkyl theophylline compound selected from the group consisting of an 8-di-n-butylamino lower alkyl theophylline of the formula

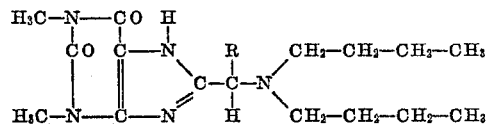

wherein R is a member selected from the group consisting of hydrogen and the methyl radical, and its acid addition salts, the acid component thereof being a substantially non-toxic acid.

References Cited in the file of this patent

UNITED STATES PATENTS 955,587    Englemann _____ Apr. 19, 1910

FOREIGN PATENTS 669,070    Great Britain _____ Mar. 26, 1952

OTHER REFERENCES

Golovchinskaya et al.: J. Gen. Chem. (U.S.S.R.) 22, pp. 535–540 (1952), cited in Chem. Abstracts, 47, 5360 (1953).